United States Patent [19]

Coulson et al.

[11] Patent Number: 5,367,647
[45] Date of Patent: Nov. 22, 1994

[54] APPARATUS AND METHOD FOR ACHIEVING IMPROVED SCSI BUS CONTROL CAPACITY

[75] Inventors: Richard L. Coulson, Beaverton; Vincent G. O'Malley, Aloha; Robert J. Safranek, Portland, all of Oreg.

[73] Assignee: Sequent Computer Systems, Inc., Beaverton, Oreg.

[21] Appl. No.: 93,452

[22] Filed: Jul. 19, 1993

Related U.S. Application Data

[63] Continuation of Ser. No. 747,659, Aug. 19, 1991, abandoned.

[51] Int. Cl.5 .................................... G06F 13/28
[52] U.S. Cl. .......................... 395/325; 395/725
[58] Field of Search ............... 395/200, 275, 325, 425, 395/725

[56] References Cited

U.S. PATENT DOCUMENTS

| | | | |
|---|---|---|---|
| 4,727,475 | 2/1988 | Kiremidjian | 395/275 |
| 4,773,005 | 9/1988 | Sullivan | 395/275 |
| 4,783,730 | 11/1988 | Fischer | 364/200 |
| 4,821,170 | 4/1989 | Bernick et al. | 395/275 |
| 4,864,532 | 9/1989 | Reene et al. | 364/900 |
| 4,965,801 | 10/1990 | Dulac | 395/275 |
| 5,033,049 | 7/1991 | Keener et al. | 395/275 |
| 5,068,785 | 11/1991 | Sugiyama | 395/325 |
| 5,081,578 | 11/1992 | Davis | 395/325 |
| 5,129,072 | 7/1992 | Larner et al. | 395/425 |
| 5,163,131 | 11/1992 | Row et al. | 395/200 |
| 5,175,822 | 12/1992 | Dixon et al. | 395/275 |
| 5,182,800 | 1/1993 | Farrell et al. | 395/425 |
| 5,239,632 | 8/1993 | Larner | 395/325 |
| 5,283,872 | 2/1994 | Ohnishi | 395/725 |
| 5,293,624 | 3/1994 | Andrade et al. | 395/425 |

FOREIGN PATENT DOCUMENTS

| | | | |
|---|---|---|---|
| 0169455 | 1/1986 | European Pat. Off. | G06F 15/16 |
| 8904578 | 5/1989 | WIPO | H04Q 3/00 |

*Primary Examiner*—Allen R. MacDonald
*Assistant Examiner*—Tariq Hafiz
*Attorney, Agent, or Firm*—Stoel Rives Boley Jones & Grey

[57] ABSTRACT

An apparatus and a method facilitate the sharing of a SCSI address ID between a SCSI initiator and a target device. The SCSI standard does not prohibit ID sharing under a set of operating conditions defined by this invention. The shared ID is preferably used for controlling an environmental monitor device that controls the power of disk drives on the SCSI bus, detects their status and configuration, and monitors environmental conditions within a mass storage system cabinet. Power to individual disk drives is switched under control of the computer operating system so that start-up surge current to the disk drives is limited. This allows defective drives to be powered down and replaced without powering down the remaining good drives. SCSI termination power distribution is improved so that connector reversals can be detected and resulting current surges limited. Termination power control and status is under program control. The reliability, utility, and cost-effectiveness of large SCSI bus-based mass storage systems is improved through the use of this invention.

4 Claims, 5 Drawing Sheets

APPARATUS AND METHOD FOR ACHIEVING IMPROVED SCSI BUS CONTROL CAPACITY

This is a continuation of application Ser. No. 07/747,659, filed Aug. 19, 1991, now abandoned.

TECHNICAL FIELD

This invention relates to peripheral control systems in a computer system, and more particularly to improvements to the Small Computer System Interface ("SCSI") bus that improve its device address capacity, reliability, and utility in a large computer system.

BACKGROUND OF THE INVENTION

There have been previously known apparatus and methods for controlling and interconnecting mass storage devices such as disk drives in a large computer system. Digital Equipment Corporation, Maynard, Mass., sells a subsystem known as the MAS bus for controlling mass storage devices used with its VAX series of computers. In like manner, Sequent Computer Systems, Beaverton, Oreg., has used storage module device disk drives (SMD) and controllers in its Balance 8000 and S-Series computers. Such disk controller systems and disk drives are capable of high performance and large data capacity, but the cost, performance, and reliability of such systems has needed improvement. Such systems also have depended on a few large storage capacity disk drives for data storage. Whenever such a drive failed, the entire computing system usually failed with it, and large amounts of valuable data were potentially lost.

Disk drives and controllers for personal computers have been developed that utilize the SCSI bus standard for control and transfer of data to be stored. The SCSI standard is described in the Draft Proposed American National Standard document entitled, "Small Computer System Interface-2 (SCSI-II)," as prepared by the Accredited Standards Committee of the Computer and Business Equipment Manufacturers Association.

FIG. 1 illustrates the major components of a typical mass storage system 10. A SCSI bus 12 interconnects a host adapter 14 with controllers 16A, 16B, and 16C (collectively "controllers 16"). Host adapter 14 and controllers 16 are functionally similar and are commercially available circuits such as model numbers 53C90 or 5380 available from NCR Corporation of Colorado Springs, Colo. SCSI bus 12 is terminated at each end by termination networks 18A and 18B (collectively "terminations 18") of types described in the SCSI standard document. SCSI bus 12 includes a termination power conductor 20 that is coupled to a termination power supply 22 through a diode 24 and a fuse 26. Host adapter 14 is in communication with a computer 28, and controllers 16 are in communication with peripheral devices 30A, 30B, and 30C (collectively "peripheral devices 30"). In mass storage system 10, peripheral devices 30, usually disk drives, and controllers 16 are commonly embedded in the same peripheral device housing and powered by embedded power supplies operating from switched AC-line power sources.

The large installed base of personal computer installations has driven the development of faster and larger capacity SCSI bus-based disk drives at decreasing costs. The performance/cost ratio of SCSI bus-based mass storage systems has improved so much that large system manufacturers, such as Sequent Computer Systems, now prefer to use SCSI bus-based mass storage systems with its computers.

SCSI bus-based mass storage systems typically use a large number of disk drives to achieve the required data capacities. There are benefits to distributing data across a large number of smaller capacity drives including faster average access time, improved mass storage system reliability, and reduced data loss in the event of a drive failure.

A problem with SCSI-I bus-based mass storage systems is that only eight device addresses are possible, thereby limiting such systems to one host adapter 14 and seven controllers 16. If more than seven peripheral devices 30 are required, multiple host adapters 14 must be added to mass storage system 10.

Another problem with SCSI bus-based mass storage systems is that the SCSI standard allows the use of non-keyed bus connectors. Such connectors can be installed backwards, thereby causing short-circuit conditions for all the bus driver circuits and the termination power. When they occur in the field, such conditions cause fuse 26 to blow out, thereby resulting in a costly field repair.

A third problem is the serviceability of systems having many peripheral devices 30. Equipment cabinets designed to contain multiple peripheral devices 30 must be designed to enable removal and replacement of individual devices while the remaining devices are still operating. The removal of individual devices also tends to adversely affect the cooling and power stability of the remaining devices. Designing and managing the cabling and configurations of such systems is also difficult.

The SCSI-II standard has addressed some of the problems inherent in the SCSI-I standard. The device addressing has been increased to a limit of sixteen devices, and higher performance cable and connector schemes have been incorporated into the SCSI-II standard. However, the connector keying, cooling, power distribution, and serviceability problems remain. There is also a need to maintain SCSI-I compatibility for reasons of field upgradability and compatibility with existing systems.

SUMMARY OF THE INVENTION

An object of this invention is, therefore, to increase the number of addressable devices on a SCSI bus without violating the SCSI standard.

Another object of this invention is to monitor the mass storage system configuration and environmental conditions and to communicate the status thereof to the controlling computer and to the user by means of a SCSI bus.

A further object of this invention is to control the electrical power of individual mass storage devices by means of the SCSI bus without disturbing the electrical power distributed to the remaining mass storage devices.

Yet another object of this invention is to provide a SCSI termination power system capable of detecting erroneous cable connections and preventing short-circuits that result in blown fuses.

The present invention is a method and an apparatus for sharing device addresses between different devices on a bus to thereby increase the number of devices that can utilize the bus. A preferred embodiment of this invention implements a method and an apparatus for sharing SCSI address ID numbers between a SCSI host adapter and a SCSI controller on the bus. The SCSI standard does not prohibit such a method of ID sharing under a set of operating conditions embodied in one aspect of this invention. The shared SCSI address ID number is used in another aspect of this invention for controlling an environmental monitoring device that is capable of controlling the application of electrical power to individual disk drives, detecting their operating status, determining their configuration, illuminating status indicator lamps, and monitoring fan operation and temperature within the mass storage system cabinet, This invention also provides apparatus in which electrical power delivered to individual disk drives can be switched under control of the computer operating system in a manner that limits the start-up surge current for the disk drives. This circuit allows defective drives to be powered down, removed, and replaced without powering down the remaining operational drives.

This invention further provides a SCSI termination power system that can detect SCSI interconnection faults, limit the termination power current flow thereby eliminating blown fuses, and communicate termination power status to the controlling computer.

The reliability, utility, and cost-effectiveness of SCSI bus-based mass storage systems is improved through the use of this invention.

Additional objects and advantages of this invention will be apparent from the following detailed description of a preferred embodiment thereof which proceeds with reference to the accompanying drawings.

DETAILED DESCRIPTION OF PREFERRED EMBODIMENTS

Figure 1:
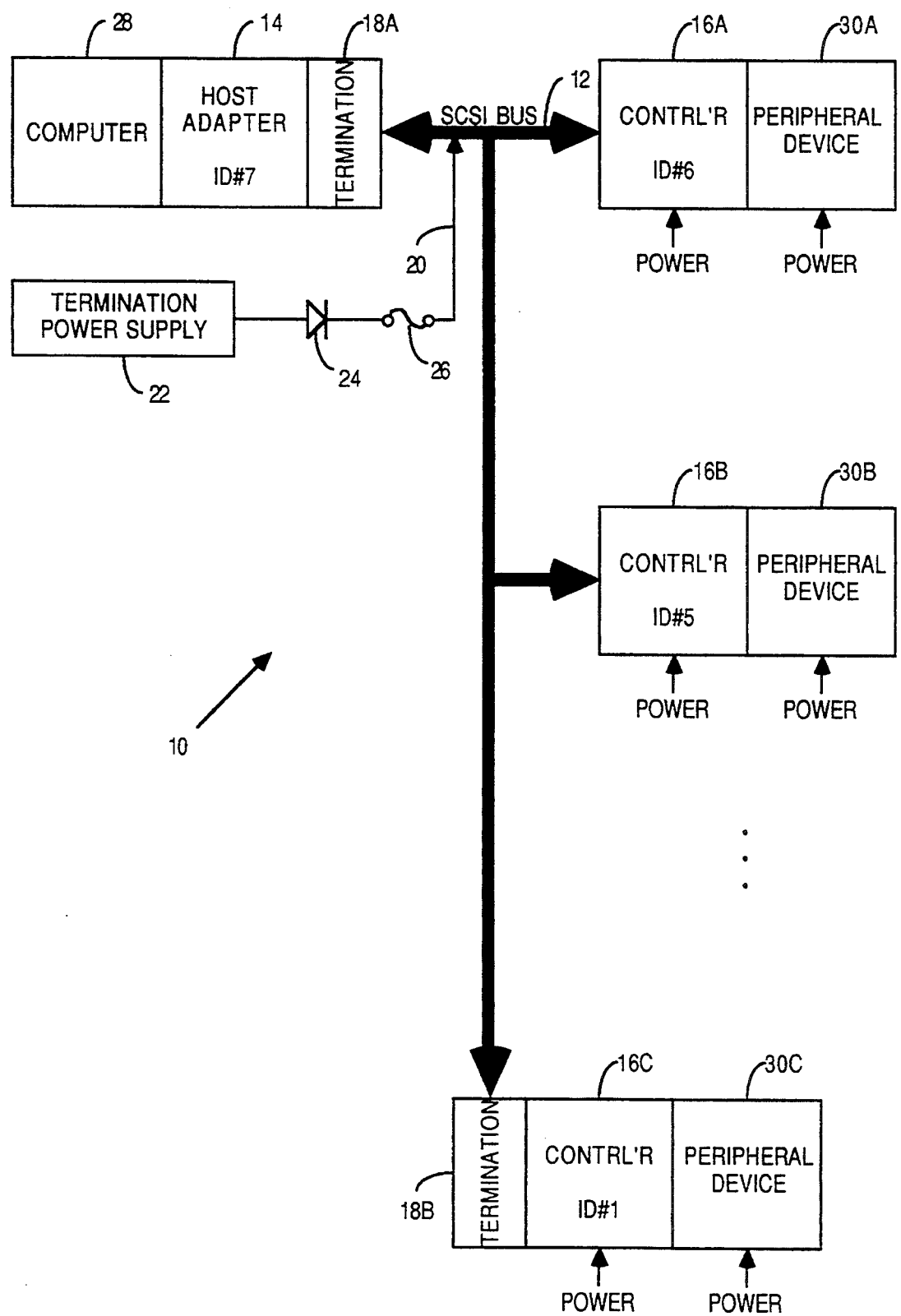
FIG. 1 is a block diagram showing the major elements of a prior art SCSI bus-based mass storage system.

Referring again to FIG. 1, communication across SCSI bus 12 is allowed between only two devices at any given time. When a pair of devices communicate using SCSI bus 12, one device acts as an "initiator" and the other acts as a "target." The initiator originates an operation, and the target performs the operation. The operations follow a sequence of phases described later.

In a typical mass storage system 10, host adapter 14 acts as the "initiator," and one of the device controllers 16 acts as the "target." The SCSI standard does not attempt to distinguish between a computer 28 and host adapter 14. The term "initiator" encompasses both. The term "target" refers to one of the controllers 16 peripheral devices 30, which may be separate from the peripheral devices (bridge controllers) or merged with them (embedded controllers). Host adapter 14 and controllers 16 usually have fixed roles as an initiator and targets, respectively, but they may be able to assume either role.

SCSI bus 12 has signal lines that include eight data bits DB(0) through DB(7). The SCSI standard allows a maximum total of eight devices on SCSI bus 12 at any one time because each SCSI device is assigned one bit in an eight bit SCSI data byte comprising DB(0) through DB(7) as an address. Device address ID#0 corresponds to DB(0), and device address ID#7 corresponds to DB(7). Such an addressing scheme is known as "logical addressing."

The SCSI-II standard specification describes a total of 18 SCSI bus signals on an A cable and 29 signals on a B cable, with SCSI-I being supportable by the A cable without need for the B cable signals. The following embodiment of the present invention utilizes and describes only the A cable signals, but is extensible to include the B cable signals. A non-standard "P" cable can also be used that includes both the A and B cable signals.

Some of the SCSI bus signals are "OR-tied," which means that any of the devices on the bus can actuate the particular signal. The signals on SCSI bus 12 are described as follows:

BSY (BUSY). An "OR-tied" signal that indicates that SCSI bus 12 is being used.

SEL (SELECT). An "OR-tied" signal used by an initiator to select a target or by a target to reselect an initiator.

C/D (CONTROL/DATA). A signal driven by a target that indicates whether CONTROL phase or DATA phase information is on the DATA BUS. A true logic state indicates CONTROL. Bus phases are described below.

I/O (INPUT/OUTPUT). A signal driven by a target that controls the direction of data movement on the DATA BUS with respect to an initiator. A true logic state indicates input to the initiator. This signal is also used to distinguish between SELECTION and RESELECTION phases.

MSG (MESSAGE). A signal driven by a target during a MESSAGE phase.

REQ (REQUEST). A signal driven by a target on the A cable to indicate a request for REQ/ACK data transfer handshake.

ACK (ACKNOWLEDGE). A signal driven by an initiator on the A cable to indicate acknowledgment to a REQ/ACK data transfer handshake.

ATN (ATTENTION). A signal driven by an initiator to indicate an ATTENTION condition.

RST (RESET). An "OR-tied" signal that indicates a RESET condition.

DB(7-0, P) (DATA BUS). Eight data-bit signals, plus a parity-bit signal that form a DATA BUS. DB(7) is the most significant bit and has the highest priority during an ARBITRATION phase. A data bit is defined as having a "one" state when the signal value is true and is defined as having a "zero" state when the signal value is false. Data parity DB(P) is odd according to the SCSI standard.

SCSI bus 12 signals are actively driven true when asserted. In the case of "OR-tied" signals, the signals are not actively driven to the false state, rather the bias circuitry of bus terminations 18 pulls the signal false whenever it is released by the drivers at any SCSI device. Non-OR-tied signals may be actively driven false. In the SCSI standard, wherever the term "negated" is used, it means that the signal may be actively driven false, or may be simply released in which case the bias circuitry of terminations 18 pulls it false.

Figure 2:
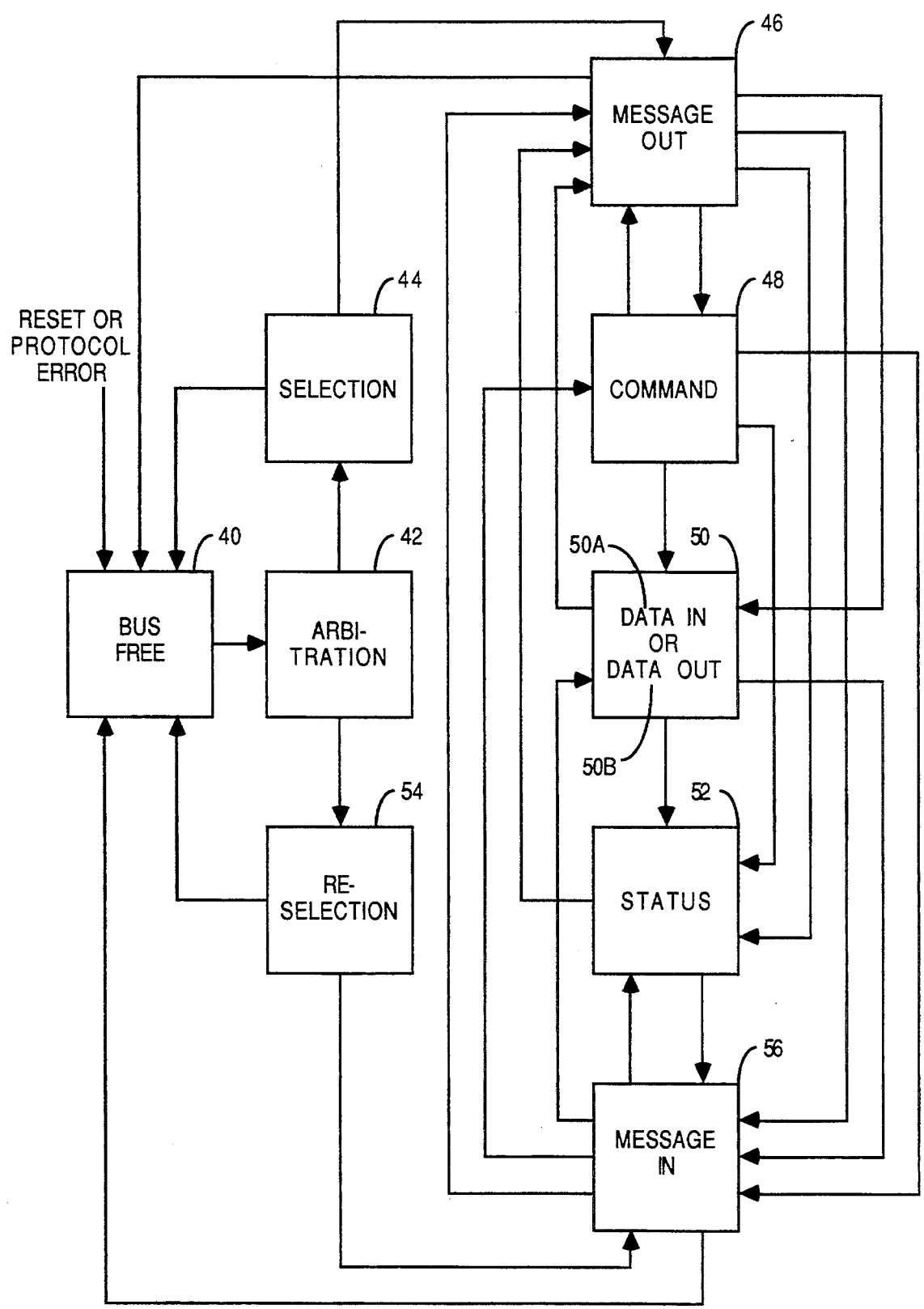
FIG. 2 is a block diagram showing the data flow paths of the prior art SCSI bus control and data phases.

FIG. 2 illustrates the interrelationship of the various phases of SCSI bus 12 operation. Certain phases of SCSI bus 12 operation are assigned to the initiator, and other phases are assigned to the target. When SCSI bus 12 is idle, it is in a "bus free" phase 40. In an "arbitration" phase 42, the initiator may arbitrate for SCSI bus 12 and then select a particular target during a selection phase 44. A "message out" phase 46 is used to control subsequent phases of SCSI bus 12 operation. In response to message out phase 46, the target may send or receive information in a "command" phase 48, a "data in or data out" phase 50, or a "status" phase 52. Data in or data out phase 50 is further divided into two subphases, "data in" phase 50A and "data out" phase 50B. A "message in" phase 56 generally communicates completion of some operation and when completed returns SCSI bus 12 to bus free phase 40.

In some cases the target may arbitrate for SCSI bus 12 and cause a "reselection" phase 54 for the purpose of causing an initiator to continue a previously started operation. For example, reselection phase 54 is useful whenever an initiator commands a target disk drive to find a particular set of data and to transfer the set of data back to the initiator. The target disconnects during the time it is seeking the physical location of the data, allowing SCSI bus 12 to perform other commands. When the data are located, the target reselects SCSI bus 12 and completes the originally issued command.

The following example describes the signal sequencing relationships of a process that includes most of the SCSI bus phases. Signal timing relationships are all in accordance with SCSI bus 12 standard. In this example, the target does not disconnect from SCSI bus 12 prior to completing the process. Table 1 illustrates the SCSI bus phase sequence example described below for a typical "data in" phase 50A command. The "key" following Table 1 describes the signal state abbreviations used.

TABLE 1

| BUS SIGNAL--> | B S Y | S E L | A T N | M S G | C / D | I / O | R E Q | A C K | R S T | D B (7-0) | D B (P) | COMMENTS |
|---|---|---|---|---|---|---|---|---|---|---|---|---|
| BUS PHASE | | | | | | | | | | | | |
| BUS FREE | — | — | — | — | — | — | — | — | — | — | — | Bus available. |
| ARBITRATION | 1 | — | — | — | — | — | — | — | — | ID | X | Initiator tries |
| | | 1 | | | | | | | | | | to get the bus. |
| SELECTION | 1 | 1 | 1 | — | — | — | — | 0 | — | ID I,T | V | Initiator has |
| | — | 1 | | | | | | | | ID I,T | V | the bus and |
| | 1 | 1 | | | | | | | | ID I,T | V | selects target. |
| | 1 | — | | | | | | | | X | X | ATN is on. |
| MESSAGE OUT | 1 | — | 1 | 1 | 1 | 0 | 0 | 0 | — | X | X | Target controls |
| | | | 1 | | | | 1 | 0 | | X | X | the bus and gets |
| | | | 0 | | | | 1 | 1 | | MSG | V | IDENTIFY message |
| | | | 0 | | | | 0 | 1 | | X | X | from the |
| | | | 0 | | | | 0 | 0 | | X | X | initiator. |
| COMMAND | 1 | — | 0 | 0 | 1 | 0 | 0 | 0 | — | X | X | Target gets CMD |
| | | | | | | | 1 | 0 | | X | X | byte from the |
| | | | | | | | 1 | 1 | | CMD | V | initiator. |
| | | | | | | | 0 | 1 | | X | X | Handshake repeats each byte. |
| DATA IN | 1 | — | 0 | 0 | 0 | 1 | 0 | 0 | — | X | X | Target sends |
| | | | | | | | 1 | 0 | | R DATA | X | data to |
| | | | | | | | 1 | 1 | | X | X | initiator. |
| | | | | | | | 0 | 1 | | X | X | Handshake repeats each byte. |
| | | | | | | | 0 | 0 | | X | X | |
| STATUS | 1 | — | 0 | 0 | 1 | 1 | 0 | 0 | — | X | X | Target sends |
| | | | | | | | 1 | 0 | | STATUS | V | status to the |
| | | | | | | | 1 | 1 | | X | X | initiator. |
| | | | | | | | 0 | 1 | | X | X | |
| | | | | | | | 0 | 0 | | X | X | |
| MESSAGE IN | 1 | — | 0 | 1 | 1 | 1 | 0 | 0 | — | X | X | Target sends |
| | | | | | | | 1 | 0 | | MSG | V | COMMAND COMPLETE |
| | | | | | | | 1 | 1 | | X | X | message to the |
| | | | | | | | 0 | 1 | | X | X | initiator. |
| | | | | | | | 0 | 0 | | X | X | |
| BUS FREE | — | — | — | — | — | — | — | — | — | — | — | Bus available. |

KEY TO TABLE 1
— = Passive
0 = False
1 = True
"Blank" = Same as the previous state
ID = ID for arbitration
ID I,T = ID of initiator and target
V = Parity is valid
X = Signal not in a known state SCSI bus 12 phase sequence example:

BUS FREE phase 40. This phase begins when the SEL and BSY signals are false and ends when the BSY signal becomes true.

ARBITRATION phase 42. This phase begins after BUS FREE phase 40 is ended as the initiator asserts the BSY signal and its device ID bit on the DATA BUS. The initiator then examines the DATA BUS. If a higher priority device ID bit is true, the initiator loses arbitration and releases the BSY signal and its ID bit. Otherwise, the initiator wins the arbitration and asserts the SEL signal. All SCSI devices must release their BSY signals and ID bits after the SEL signal becomes true.

SELECTION phase 44. The I/O signal is false during this phase to distinguish it from RESELECTION phase 54. The SCSI device that won arbitration has the BSY and SEL signals asserted, and then the target and the initiator SCSI ID bits are asserted on the DATA BUS. The initiator next releases the BSY signal. The target determines that it has been selected when the SEL signal and its SCSI ID bit are true and the BSY and I/O signals are false. The target then asserts the BSY signal and releases the SEL signal.

MESSAGE OUT phase 46. During this phase the initiator sends an IDENTIFY message to the target. The target asserts the C/D and MSG signals and negates the I/O signal for the message transfer. After detecting the assertion of the REQ signal, the initiator negates the ATN signal before asserting the ACK signal. (The handshake procedure for COMMAND phase is described below).

COMMAND PHASE 48. The target asserts the C/D signal and negates the I/O and MSG signals for all of the bytes transferred during this phase. The direction of transfer is from the initiator to the target.

The COMMAND phase operates in accordance with the following handshake procedure. The target asserts the REQ signal. Upon detecting that the REQ signal is true, the initiator drives the DATA BUS to the desired values and then asserts the ACK signal. The initiator continues to drive the DATA BUS until the REQ signal is false. When the ACK signal is true at the target, the target reads the DATA BUS and then negates the REQ signal. When the REQ signals becomes false at the initiator, the initiator may change or release the DATA BUS and negate the ACK signal. The target may continue to request command bytes by reasserting the REQ signal.

DATA IN phase 50A. The target asserts the I/O signal and negates the C/D and MSG signals for all of the bytes transferred during this phase. The direction of transfer is from the target to the initiator.

The DATA IN phase operates in accordance with the following handshake procedure. The target drives the DATA BUS lines to their desired values and then asserts the REQ signal. The target continues to drive the DATA BUS until the ACK signal is true. When the REQ signal is detected as true at the initiator, the initiator reads the DATA BUS and then asserts the ACK signal. When the ACK signal is detected as true at the target, the target may change or release the DATA BUS and negate the REQ signal. When the REQ signal is false at the initiator, the initiator negates the ACK signal. After the ACK signal is false, the target may continue the transfer by driving the DATA BUS and asserting the REQ signal as described above.

DATA OUT phase 50B. The target negates the C/D, I/O, and MSG signals for all of the bytes transferred during this phase. The direction of transfer is from the initiator to the target. (The handshake procedure is the same as that described above for the COMMAND phase).

STATUS phase 52. The target asserts the C/D and I/O signals and negates the MSG signal for the byte transferred during this phase. The direction of transfer is from the target to the initiator. (The handshake procedure is the same as that described above for the DATA IN phase).

MESSAGE IN phase 56. The target asserts the C/D, I/O, and MSG signals during the bytes transferred during this phase. Typically, a COMMAND COMPLETE message would be sent during this phase. The direction of transfer is from the target to the initiator. (The handshake procedure is the same as that described above for the DATA IN phase).

BUS FREE phase 40. The target returns bus free phase 40 by releasing the BSY signal following which the target and the initiator release all remaining bus signals. The completion of this phase concludes the example.

The SCSI logical device addressing scheme and certain of the phase sequences described in the SCSI standard allow for ID address sharing between an initiator and a target. The SCSI standard does not describe address sharing, which permits inclusion of one additional device to the specified capacity of SCSI bus 12. Any of the phase sequence paths shown in FIG. 2 can utilize the ID address sharing scheme except for those requiring reselection 54.

ID address sharing proceeds according to the following scheme. The initiator asserts the REQUEST signal, which starts an arbitration phase 42. The initiator then enters selection phase 44 and asserts the ID address of the target device, which in this case is the same as the host adapter ID address. The premise underlying address sharing is that the host adapter logic is either sufficiently smart to know that it is not addressing itself or is too dumb to know the difference. In any event, the target connects to the initiator and must not disconnect until the desired phases are completed. The target does not need to formally arbitrate. Other devices sharing SCSI bus 12 having different ID addresses will not respond.

The target must not disconnect from the SCSI bus because it has no unique ID address and, therefore, has no way of reestablishing arbitration for the SCSI bus. The initiator uses the shared ID address in arbitration. The target only responds; it never initiates, selects, or reselects.

Because it has the same ID address as the initiator, the target will detect reselections intended for the initiator from other devices on SCSI bus 12, thereby creating a conflict. To avoid the conflict, the target must ignore these reselections but respond to selections. The conflict resolution is accomplished by either detecting the reselection phase (I/O signal will be true), or by examining the ID addresses on the bus (there must be only one bit true). If there is more than one bit true, meaning that another peripheral is reselecting the host, the target must ignore subsequent bus sequences until detection of a valid selection phase 44.

The ID address sharing scheme can be extended to the case in which the mass storage system includes two host adapters. In such a case, the target needs to respond to either of two shared IDs, depending on which host adapter is making the selection. The target must handle and distinguish between selections and reselections from two different shared ID addresses in the same manner as described above.

The ID address sharing scheme does not interfere with normal SCSI operation and does not violate the SCSI standard. The SCSI standard does not specify that an initiator and target have different address ID numbers, nor is reselection phase 54 required for devices.

The invention is implemented with conventional SCSI protocol controller chips such as type No. 5380 manufactured by NCR Corporation of Colorado Springs, Colo.

Figure 3:
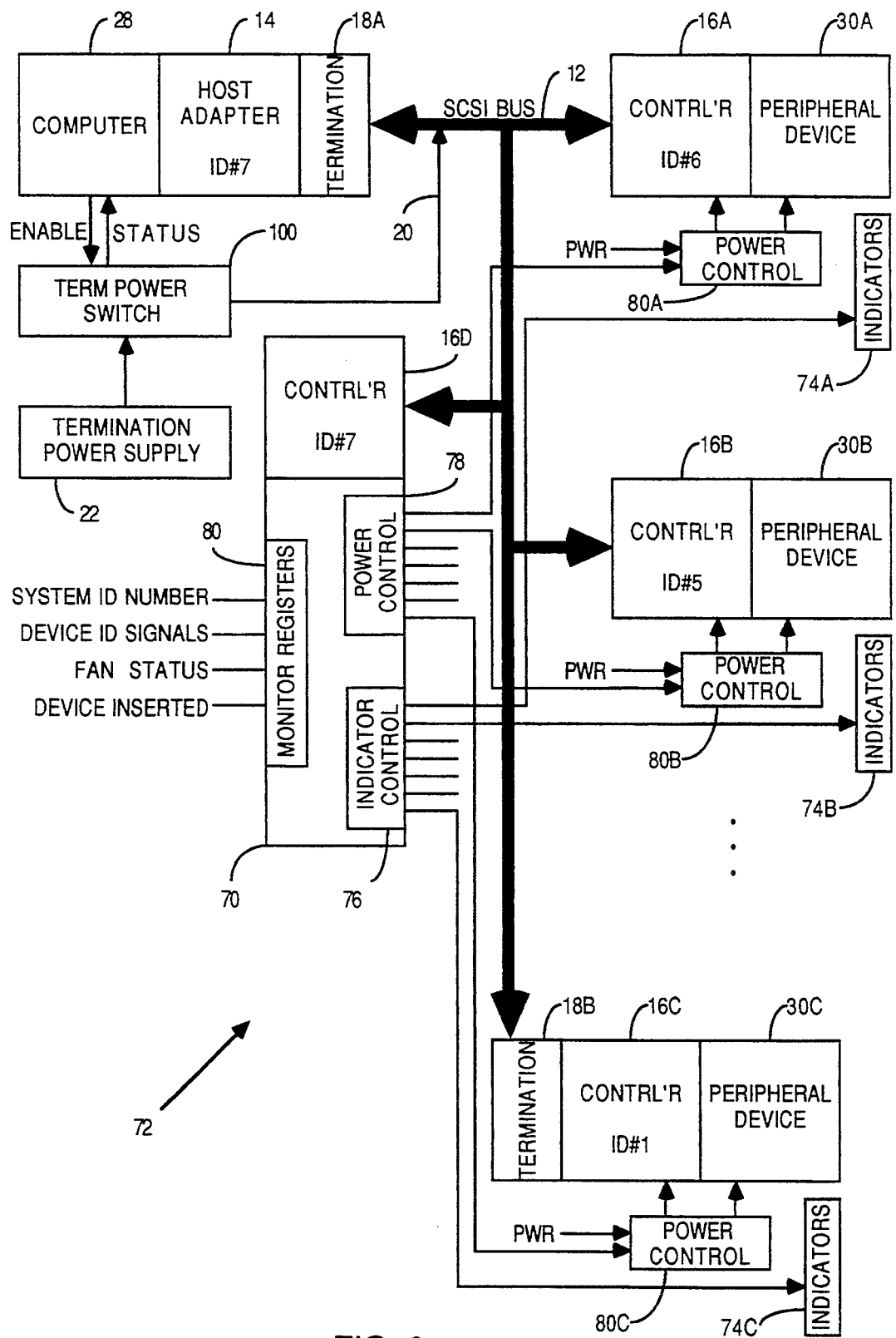
FIG. 3 is a block diagram showing the major elements of an improved SCSI bus-based mass storage system including monitoring and controlling elements according to this invention.

Referring to FIG. 3, ID address sharing is shown in use for controlling and communicating with an environmental and on-line replacement monitor board 70 in an improved mass storage system 72. In this embodiment, host adapter 14 is the initiator and shares ID address #7 with controller 16D, which is the target controller for monitor board 70. In practice, any of the SCSI ID addresses could be shared, but ID #7 was chosen because it has the highest bus priority. Controller 16D communicates with monitor board 70 by well-known register-to-register transfers. It should be noted that even though monitor board 70 is shown as being functionally separate from controller 16D, controller 16D is actually embedded within monitor board 70.

Monitor board 70 serves multiple functions including controlling the power to controllers 16 and peripheral devices 30, monitoring cooling fan operation, monitoring which of peripheral devices 30 are installed, monitoring which ID addresses are assigned to each of peripheral devices 30, and driving a set of indicators 74A, 74B, and 74C (collectively "indicators 74"). Each of indicators 74 includes light emitting diodes ("LEDs") that illuminate legends indicative of the status of peripheral devices 30 including "active," "fail" and "repair"

Monitor board 70 responds to vendor unique SCSI commands issued by computer 28 that activate the above described functionality. The commands are implemented according to syntax described in the SCSI standard. The commands activate indicator control register 76, a power control register 78, and a monitor register 80 in monitor board 70. Control commands set bits in indicator control register 74 and power control register 76, and read commands read the states of bits in monitor register 78.

The individual bits in indicator control register 74 control corresponding individual LEDs in indicators 74 by conventional means. In like manner, the bits in power control register 78 control a set of power control circuits 80A, 80B, and 80C (collectively "power controls 80"). Power controls 80 are described below.

Monitor register 78 contains bits for storing the state of various signals indicative of parameters of improved mass storage system 72. The signals include an "inserted" signal for each of peripheral devices 30, a "device ID" signal code for each of peripheral devices 30, a "fan fail" signal for each cooling fan (not shown), and a "system ID" for uniquely identifying improved mass storage system 72 to computer 28. The state of bits in monitor register 78 are transmitted to computer 28 by means of controller 16D, SCSI bus 12, and host adapter 14.

The use of SCSI bus 12 for transferring the above control commands and monitor data eliminates the need for additional control cables and connectors between computer 28 and monitor board 70. The buildability, serviceability, reliability, and cost effectiveness of mass storage system 60 are thereby improved.

An on-line replacement scheme for peripheral devices 30 requires apparatus for software control of power for selected ones of the devices. In a typical scenario, computer 28 detects a fault in the data received from peripheral device 30B. Computer 28 responds by sending to monitor board 70 commands that illuminate the indicator 74B "fail" LED and turn off the power to peripheral device 30B. When peripheral device 30B is deactivated, computer 28 sends to monitor board 70 a command that illuminates the indicator 74B "repair" LED. Peripheral device 30B can then be safely replaced. Computer 28 detects removal and replacement of peripheral device 30B by checking the state of the appropriate "device inserted" bit in monitor register 80. Following replacement, computer 28 commands power control register 78 to restore power to peripheral device 30B. Computer 28 also commands indicator control register 76 to extinguish the indicator 74B "repair" and "fail" LEDs. The above scenario describes one way in which defective peripheral devices 30 installed on SCSI bus 12 can be replaced without the necessity of powering down the entire computer system.

Selectively controlling the power to peripheral devices 30 requires the minimization of surge current spikes that occur when a peripheral device such as a disk drive is powered up. Surge current spikes are caused by inrush current required by a disk drive while its power filter capacitors are charging and during the initial "spin-up" of its drive motor. Disk drives sharing SCSI bus 12 typically use a common power supply. Inrush current can therefore, cause the common power supply to drop out of regulation, thereby causing a voltage spike and possibly degrading data being transferred by other disk drives sharing SCSI bus 12. Prevention of data transfer errors is preferably accomplished by both minimizing surge current spikes and by inhibiting data transfers during the "power up" period of any disk drive. In the present invention, monitor board 70 inhibits data transfers by not returning to bus free state 40 until after the "power up" period is completed.

Figure 4:
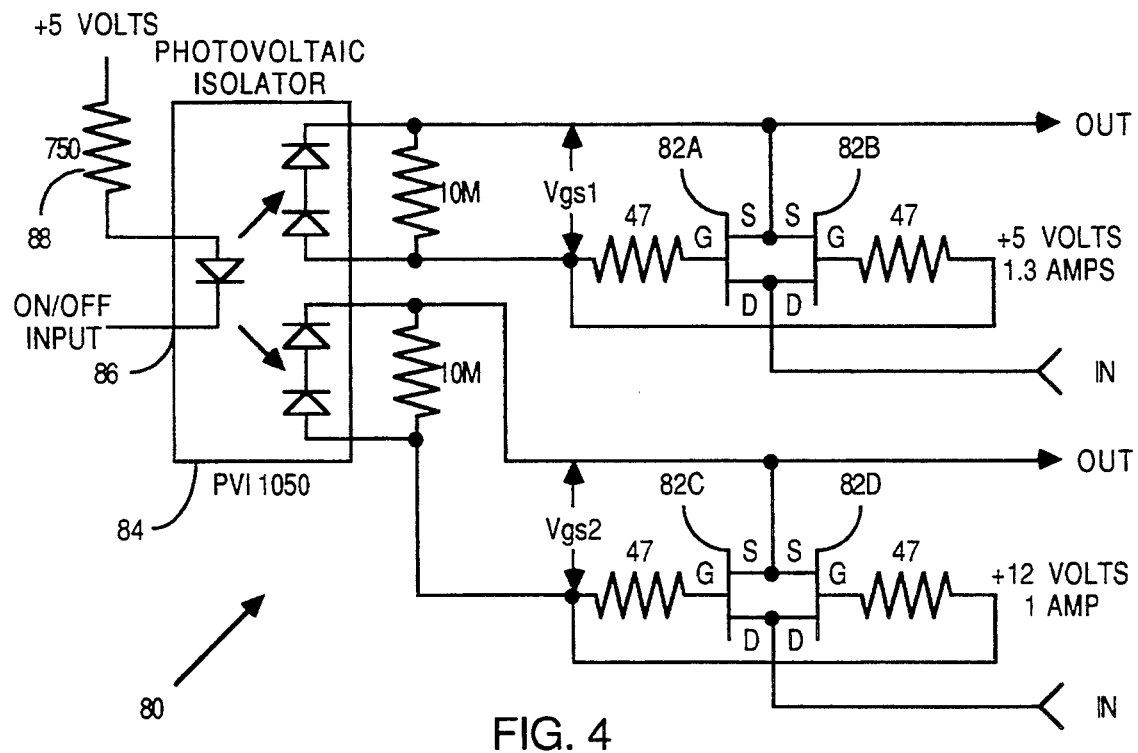
FIG. 4 is an electrical circuit diagram of the disk drive power switching circuit according to this invention.

Referring to FIG. 4, power controls 80 limit the start-up surge current of disk drives by utilizing power FET switches 82A, 82B, 82C, and 82D (collectively "FET switches 82") having controllable on-resistance. Alternative types of switching circuits, including relays and triac switches, do not have the required turn-on characteristics inherent to power FETs.

Power FET switches 82 are typically type IRL-Z44 manufactured by International Rectifier Corporation of E1 Segundo, Calif. FET switches 82 have a low series on-resistance ($R_{ds}$) and are driven by a photo-voltaic isolator 84. Photo-voltaic isolator 84 is preferably type PVI1050 manufactured by International Rectifier Corporation of E1 Segundo, Calif. When power control register 78 (FIG. 3) sends a logic false state to an input 86 of photo-voltaic isolator 84, the isolator generates a pair of floating voltages ($V_{gs1}$ and $V_{gs2}$) which are applied across the gate and source terminals of power FET switch pairs 82A-B and 82C-D, respectively. Voltages $V_{gs1}$ and $V_{ge2}$ turn on power FET switches 82 and allow them to pass current between their drain and source terminals, thereby powering up the selected peripheral device 30. Because the voltage output of photo-voltaic isolator 84 floats, can be used to turn on power FET switches 82 regardless of the voltage impressed across them.

The inrush current limiting aspect of power FET switches 82 stems from the ability to control their turn-on speed. Turn-on speed is related to the time required for photo-voltaic isolator 84 to generate sufficient $V_{gs}$ voltage to exceed the turn-on threshold of power FET switches 82. The turn-on speed of photo-voltaic isolator 84 with no load is a few microseconds. However, power FET switches 82 present a capacitive load (resulting from gate capacitance) of thousands of picofarads to photo-voltaic isolator 84. The overall response time of power FET switches 82 is, therefore, determined by how fast photo-voltaic isolator 84 can charge the gate capacitance. The charge time can be adjusted by controlling the output current of photo-voltaic isolator 84, which current is adjusted by varying the input current drawn from photo-voltaic isolator input 86. This is done by adjusting the value of current limiting resistor 88. In this embodiment of the invention, current limiting resistor 88 is 750 ohms, power FET switches 82A and 82B switch 5 volts at 1.3 amperes, and FET switches 82C and 82D switch 12 volts at 1.0 ampere. Each switch has two FETs arranged in parallel to meet the current carrying requirements for each switched voltage. One or more FETs can be utilized to adapt to differing power requirements, and current limiting resistor 88 is adjusted accordingly to compensate for differences in gate capacitance.

Figure 5A:
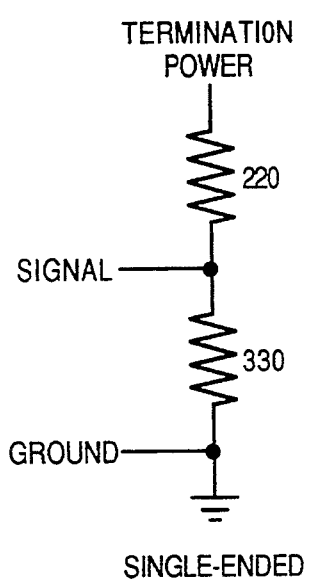
FIG. 5A is an electrical circuit diagram of a first alternative SCSI bus termination circuit for use with single-ended devices.
Figure 5C:
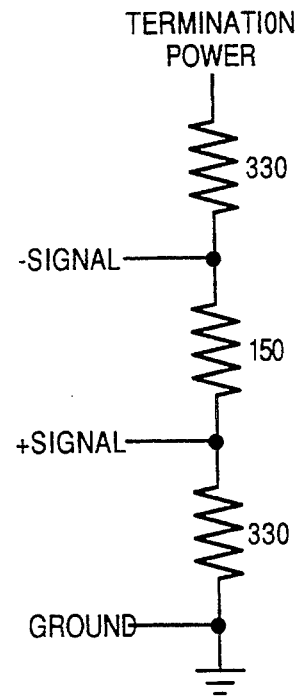
FIG. 5C is an electrical circuit diagram of a SCSI bus termination circuit for use with differential devices.
Figure 5B:
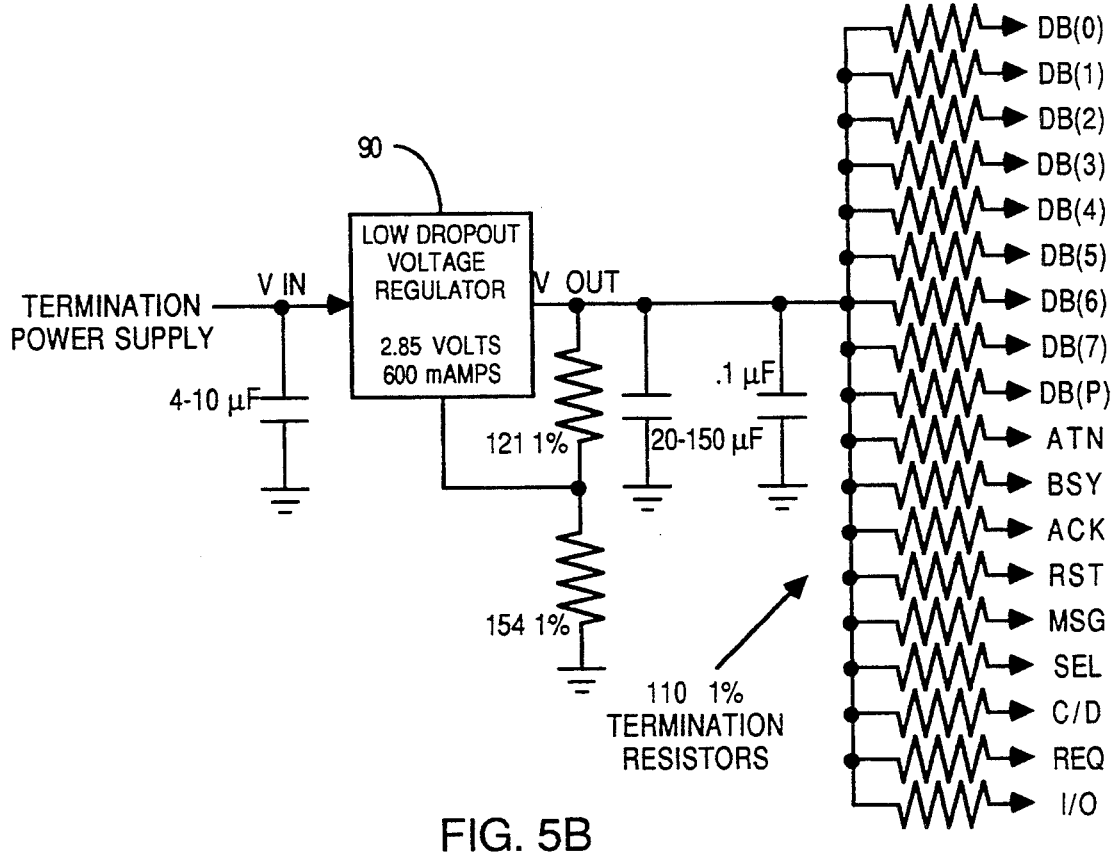
FIG. 5B is an electrical circuit diagram of a second alternative SCSI bus termination circuit for use with single-ended devices.

In improved mass storage system 72, the SCSI standard requires that termination power be supplied on SCSI bus 12 to power termination networks 18 such as those shown in FIGS. 5A, 5B, and 5C. FIGS. 5A and 5B show two specified versions of single ended termination networks 18. FIG. 5C shows a termination network usable with differential devices. SCSI bus 12 connectors specified in the SCSI standard define the termination power Dins to be directly opposite the ground pins. Furthermore, the SCSI standard specifies various connector types, some of which can be inadvertently attached upside down thereby short circuiting the termination power to ground. The use of keyed connectors is recommended but not required by the SCSI standard. Fuse 24 (FIG. 1) blows under the above conditions and necessitates an expensive field repair.

In FIG. 5B, a voltage regulator 90 is shown as specified in the SCSI standard. Voltage regulator 90 serves only to provide a termination network 18 having improved noise rejection characteristics and does not prevent the fuse blowing problem described above.

FIG. 3 shows that termination power supply 22 supplies termination power to SCSI bus 12 over termination conductor 20 as in the prior art. However, the termination power is controlled by a termination power switch 100 that replaces the conventional diode 24 and fuse 26 (FIG. 1).

Figure 6:
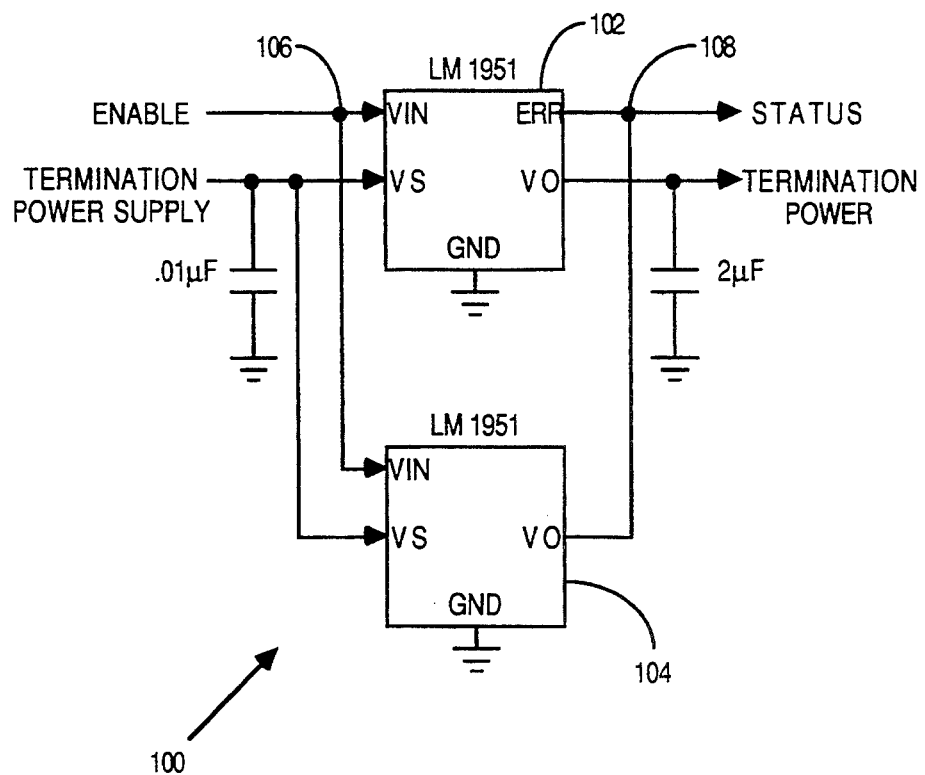
FIG. 6 is an electrical circuit diagram of the terminator power supply switch and fault detection circuit according to this invention.

Referring to FIG. 6, termination power switch 100 is comprised of a pair of National Semiconductor LM-1951, 1-Amp solid state power switch integrated circuits 102 and 104. LM-1951s 102 and 104 turn off when termination power current exceeding 1-1.5 amperes is detected, thereby eliminating the need for fuse 26.

Termination power switch 100 also allows software control of termination power by means of an enable signal 106. A termination power status signal 108 is generated to inform computer 28 of fault conditions such as excessive termination power current caused by a reversed connector.

If mass storage system 72 requires only the A cable for SCSI bus 12, then only LM-1951 102 is required. LM-1951 104 is required only for the additional termination power current requirements of the B cable.

It will be obvious to those having skill in the art that many changes may be made to the details of the above-described embodiments of this invention without departing from the underlying principles thereof. Accordingly, it will be appreciated that aspects of this invention are also applicable to mass storage control applications other than those using SCSI standard buses. In particular, address ID sharing is applicable to any bus utilizing logical addressing. The scope of the present invention should be determined, therefore, only by the following claims.

We claim:

1. A method for transferring data across a SCSI bus to which first, second, and third devices are attached and are addressed logically by associating a SCSI but data bit with a predetermined physical device address assigned to each of the devices, comprising the steps of:
   setting the first and second devices to a common first logical device address;
   setting the third device to a second logical device address;
   addressing the second device by asserting from the first device the first logical device address on the SCSI bus;
   establishing a connection between the first and second devices;
   transferring data across the SCSI bus between the first and second devices, the data comprising a command issued by the first device and a response from the second device to the command, the command and the response being completed prior to establishing a connection between the first device and the third device;
   detecting in the second device one of a reselection signal asserted by the third device and a simultaneous presence of more than one logical device address asserted on the SCSI bus; and
   inhibiting the second device from responding to subsequent data transferred from the third device to the first device.

2. The method of claim 1 further comprising the step of storing in the second device environmental data associated with the devices attached to the SCSI bus, wherein the environmental data include any of a cooling fan operation datum, a device power datum, a device insertion datum, and a device address datum.

3. The method of claim 1 in which the command is a third device power command and the response is a datum indicating whether the third device is on line.

4. A method for transferring data across a SCSI-I bus to which more than eight devices are attached and are addressed logically by associating a SCSI-I bus data bit with a predetermined physical device address assigned to each of the devices, and in which the SCSI-I bus communicates with a first computer system with which a first device is associated and a second computer system with which a third device is associated, comprising the steps of:
   installing nine devices in the SCSI-I bus, the devices including at least the first device through the ninth device;
   setting the first device to a first logical device address;
   setting the third device through ninth device to a respective second logical device address through an eighth logical device address;
   setting the second device to the first and second logical device addresses;
   addressing the second device by asserting from the first device the first logical device address on the SCSI-I bus;
   establishing a connection between the first and second devices;

transferring data across the SCSI-I bus between the first and second devices, the data comprising a command issued by the first device and a response from the second device to the command, the command and the response being completed prior to establishing a connection between the first device and any of the third through ninth devices;

establishing a connection between the second device and either one of the first or third devices;

detecting in the second device one of a reselection signal and a simultaneous presence of more than one logical device address asserted on the SCSI bus; and inhibiting the second device from responding to subsequent data transferred from the third device to the first device.

* * * * *

UNITED STATES PATENT AND TRADEMARK OFFICE
CERTIFICATE OF CORRECTION

PATENT NO. : 5,367,647
DATED : November 22, 1994
INVENTOR(S) : Richard L. Coulson and Vincent G. O'Malley It is certified that error appears in the above-indentified patent and that said Letters Patent is hereby corrected as shown below:

On the title page, delete inventor "Robert J. Safranek, Portland".

Column 3, line 12, change "," to --.--.

Column 4, line 4, after "16" insert --of--.

Column 7, line 64, change "phase )." to --phase.)--.

Column 9, line 28, after "repair" insert --.--.

Column 10, line 45, change "E1" to --El--.

Column 10, line 49, change "E1" to --El--.

Column 10, line 55, change "$V_{ge2}$" to --$V_{gs2}$--.

Column 10, line 59, after "floats," insert --it--.

Column 11, line 29, change "Dins" to --pins--.

Column 12, line 10, claim 1, line 3, change "but" to --bus--.

Signed and Sealed this

Twenty-first Day of March, 1995

Attest:

BRUCE LEHMAN

Attesting Officer     Commissioner of Patents and Trademarks